(12) United States Patent
Murashi et al.

(10) Patent No.: US 10,505,233 B2
(45) Date of Patent: Dec. 10, 2019

(54) WOUND ELECTRODE GROUP, ELECTRODE GROUP, AND NONAQUEOUS ELECTROLYTE BATTERY

(71) Applicant: Kabushiki Kaisha Toshiba, Minato-ku (JP)

(72) Inventors: Yasuaki Murashi, Kashiwazaki (JP); Nobuyasu Negishi, Kashiwazaki (JP); Tatsuya Shinoda, Kashiwazaki (JP); Koichi Takeshita, Kashiwazaki (JP); Koichi Kawamura, Fuchu (JP); Tatsuya Hashimoto, Kashiwazaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 64 days.

(21) Appl. No.: 15/453,154

(22) Filed: Mar. 8, 2017

(65) Prior Publication Data

US 2017/0179535 A1 Jun. 22, 2017

Related U.S. Application Data

(63) Continuation of application No. PCT/JP2015/075632, filed on Sep. 9, 2015.

(30) Foreign Application Priority Data

Sep. 10, 2014 (JP) .................. 2014-184229

(51) Int. Cl.
*H01M 10/0587* (2010.01)
*H01M 4/485* (2010.01)
(Continued)

(52) U.S. Cl.
CPC ..... *H01M 10/0587* (2013.01); *H01M 2/1606* (2013.01); *H01M 4/131* (2013.01);
(Continued)

(58) Field of Classification Search
CPC ......... H01M 10/0587; H01M 10/0585; H01M 4/131; H01M 4/485; H01M 4/661; H01M 4/662; H01M 2/1606
(Continued)

(56) References Cited

U.S. PATENT DOCUMENTS 6,465,125 B1 10/2002 Takami et al.
2005/0069777 A1 3/2005 Takami et al.
(Continued)

FOREIGN PATENT DOCUMENTS

EP  2 677 570  12/2013
JP  2001-143702  5/2001
(Continued)

OTHER PUBLICATIONS

International Search Report dated Dec. 8, 2015 in PCT/JP2015/075632, filed on Sep. 9, 2015 ( with English Translation).
(Continued)

*Primary Examiner* — Sean P Cullen
(74) *Attorney, Agent, or Firm* — Oblon, McClelland, Maier & Neustadt, L.L.P.

(57) ABSTRACT

According to an embodiment, an electrode is provided. The electrode group includes a stack. The stack includes a positive electrode, a negative electrode or negative electrodes, and separator. Each negative electrode includes a negative electrode current collector and a negative electrode layer provided on the negative electrode current collector. The electrode group satisfies following relational formulae (I) to (III): $10 \leq a_1/b_1 \leq 16$ (I); $0.7 \leq D_1/E_1 \leq 1.4$ (II); $E_1 \leq 85$ (III). Here, the $a_1$ [mm] is a thickness of the stack. The $b_1$ [mm] is a thickness of the negative electrode current collector, or is a total thickness of the negative electrode current collectors. The $D_1$ [μm] is a thickness of the positive electrode. The $E_1$ [μm] is a thickness of the negative electrode.

13 Claims, 6 Drawing Sheets

(51) Int. Cl.
*H01M 10/0525* (2010.01)
*H01M 2/16* (2006.01)
*H01M 4/66* (2006.01)
*H01M 4/131* (2010.01)
*H01M 10/0585* (2010.01)
*H01M 4/02* (2006.01)

(52) U.S. Cl.
CPC .......... *H01M 4/485* (2013.01); *H01M 4/661* (2013.01); *H01M 4/662* (2013.01); *H01M 10/0525* (2013.01); *H01M 10/0585* (2013.01); *H01M 2/162* (2013.01); *H01M 2004/021* (2013.01); *H01M 2004/027* (2013.01)

(58) Field of Classification Search
USPC .......................................................... 429/94
See application file for complete search history.

(56) References Cited

U.S. PATENT DOCUMENTS

| | | | | |
|---|---|---|---|---|
| 2007/0009797 | A1* | 1/2007 | Takami | H01M 2/1077 429/231.1 |
| 2007/0231693 | A1 | 10/2007 | Inagaki et al. | |
| 2008/0241687 | A1* | 10/2008 | Ishii | B60L 11/123 429/218.1 |
| 2008/0268346 | A1* | 10/2008 | Inda | H01M 4/131 429/322 |
| 2009/0029249 | A1 | 1/2009 | Takami et al. | |
| 2009/0081534 | A1* | 3/2009 | Takami | H01M 2/1626 429/149 |
| 2013/0330613 | A1* | 12/2013 | Saruwatari | H01M 4/131 429/211 |
| 2014/0079983 | A1* | 3/2014 | Murata | H01M 2/06 429/161 |

FOREIGN PATENT DOCUMENTS

| | | |
|---|---|---|
| JP | 2004-6408 | 1/2004 |
| JP | 2004-87895 A | 3/2004 |
| JP | 2007-273154 | 10/2007 |
| JP | 2007-335307 | 12/2007 |
| JP | 2007-335308 | 12/2007 |
| JP | 2008287925 A * | 11/2008 |
| JP | 2009-21134 | 1/2009 |
| JP | 2009-54480 | 3/2009 |
| JP | 2009199793 A * | 9/2009 |
| JP | 2009199798 A * | 9/2009 |
| JP | 2011-90794 | 5/2011 |
| WO | WO 2013/005135 | 1/2013 |
| WO | WO 2014/087895 A1 | 6/2014 |

OTHER PUBLICATIONS

Written Opinion dated Dec. 8, 2015 in PCT/JP2015/075632, filed on Sep. 9, 2015.
Notice of Allowance dated Jul. 4, 2017 in Japanese Patent Application No. 2016-547481.

* cited by examiner

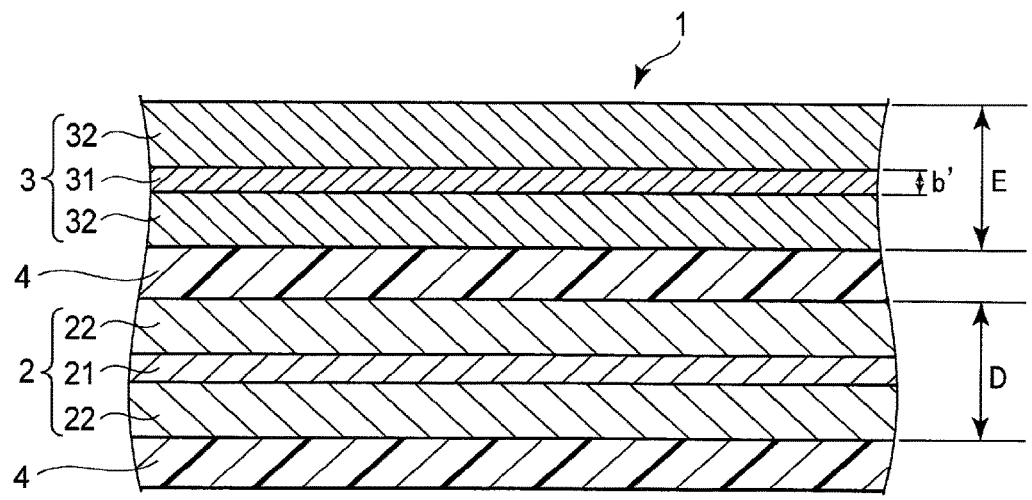
F I G. 3
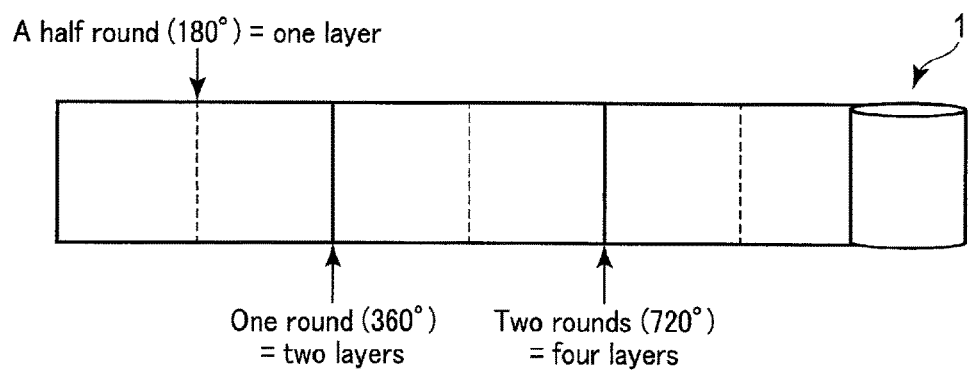
F I G. 4

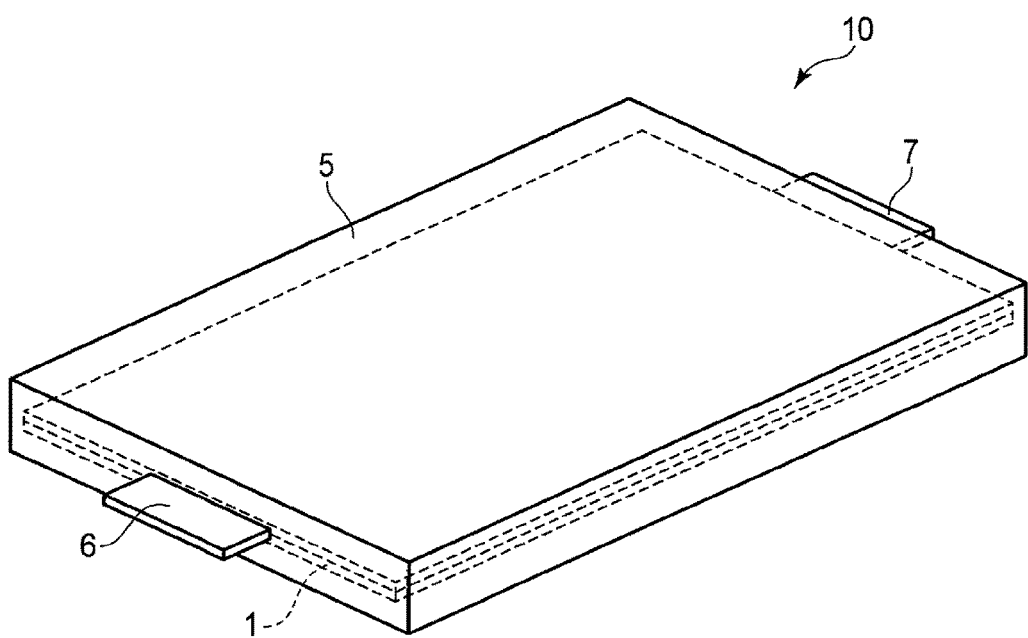
F I G. 11

WOUND ELECTRODE GROUP, ELECTRODE GROUP, AND NONAQUEOUS ELECTROLYTE BATTERY

CROSS-REFERENCE TO RELATED APPLICATIONS

This application is a Continuation Application of PCT Application No. PCT/JP2015/075632, filed Sep. 9, 2015 and based upon and claiming the benefit of priority from the Japanese Patent Application No. 2014-184229, filed Sep. 10, 2014, the entire contents of all of which are incorporated herein by reference.

FIELD

Embodiments of the present invention relate to a wound electrode group, an electrode group, and a nonaqueous electrolyte battery.

BACKGROUND

Due to the rapid progress of miniaturization techniques of electronics devices, various mobile electronic devices are spreading. Recently, batteries are used as a power source for vehicles such as automobiles. Therefore, batteries exhibiting a long lifetime, high safety, and excellent input-and-output characteristics are required.

Batteries including, as a negative electrode active material, a lithium-titanium composite oxide exhibit excellent safety and a long lifetime. The lithium titanium composite oxide, however, is an insulator in a low state-of-charge, and thus batteries including such a negative electrode active material have a problem that the input-and-output characteristics are low in a low state-of-charge.

BRIEF DESCRIPTION OF THE DRAWINGS

FIG. 3 is a schematic cross-sectional view showing a part of the wound electrode group shown in FIG. 1 and FIG. 2.

FIG. 4 is a schematic view explaining a method for determining the number of layers in a positive electrode, a negative electrode, and a separator, after developing an electrode group.

FIG. 11 is a schematic transparent perspective view showing a nonaqueous electrolyte battery, which is one example according to a fourth embodiment.

DETAILED DESCRIPTION

Figure 1:
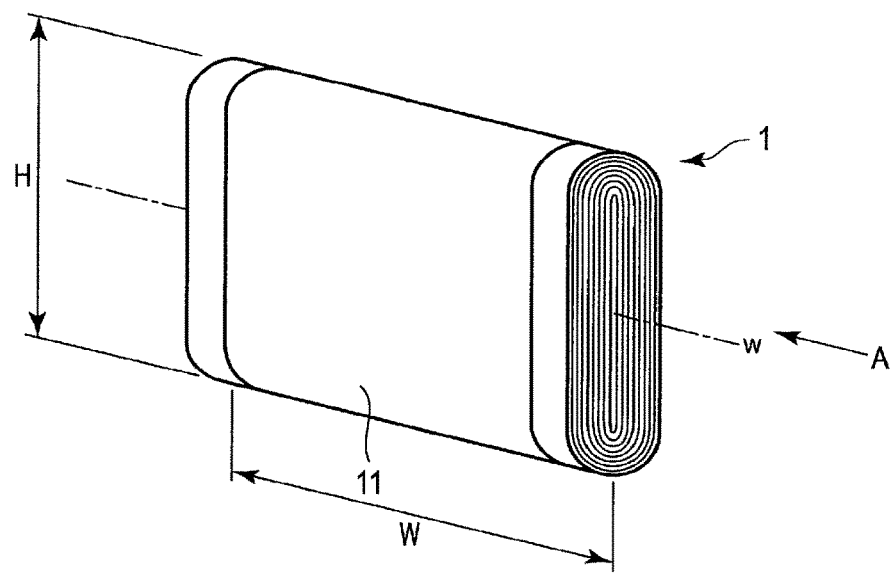
FIG. 1 is a schematic perspective view showing a wound electrode group, which is one example according to a first embodiment.

According to an embodiment, a wound electrode is provided. The wound electrode group includes a flat part.

The flat part includes a positive electrode, a negative electrode and a separator. The negative electrode including a negative electrode current collector, and a negative electrode layer provided on the negative electrode current collector. The negative electrode layer includes a lithium titanium composite oxide. The wound electrode group according to the first embodiment satisfies the following relational formulae of (1) to (3):

$$10 \leq a/b \leq 16 \quad (1);$$

$$0.7 \leq D/E \leq 1.4 \quad (2); \text{ and}$$

$$E \leq 85 \quad (3).$$

Here, the a [mm] is a thickness of the flat part of the electrode group. The b [mm] is a total thickness of the negative electrode current collector in the flat part of the electrode group. The D [μm] is a thickness of the positive electrode. The E [μm] is a thickness of the negative electrode.

According to an embodiment, a nonaqueous electrolyte battery is provided. The nonaqueous electrolyte battery includes the wound electrode group according to the embodiment, and a nonaqueous electrolyte.

According to an embodiment, an electrode group is provided. The electrode group includes a stack. The stack includes a positive electrode, a negative electrode or negative electrodes, and separator. Each negative electrode includes a negative electrode current collector and a negative electrode layer provided on the negative electrode current collector. The negative electrode layer includes a lithium titanium composite oxide. The electrode group according to the third embodiment satisfies following relational formulae (I) to (III):

$$10 \leq a_1/b_1 \leq 16 \quad (I);$$

$$0.7 \leq D_1/E_1 \leq 1.4 \quad (II); \text{ and}$$

$$E_1 \leq 85 \quad (III).$$

Here, the $a_1$ [mm] is a thickness of the stack. The $b_1$ [mm] is a thickness of the negative electrode current collector when the stack includes the negative electrode, or is a total thickness of the negative electrode current collectors when the stack includes the negative electrodes. The $D_1$ [μm] is a thickness of the positive electrode. The $E_1$ [μm] is a thickness of the negative electrode.

According to an embodiment, a nonaqueous electrolyte battery is provided. The nonaqueous electrolyte battery includes the electrode group according to the embodiment, and a nonaqueous electrolyte.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, a wound electrode is provided. The electrode group includes a flat part. The flat part includes a positive electrode, a negative electrode and a separator. The negative electrode including a negative electrode current collector, and a negative electrode layer provided on the negative electrode current collector. The negative electrode layer includes a lithium titanium composite oxide. The wound electrode group according to the first embodiment satisfies the following relational formulae of (1) to (3):

$$10 \leq a/b \leq 16 \quad (1);$$

$$0.7 \leq D/E \leq 1.4 \quad (2); \text{ and}$$

$$E \leq 85 \quad (3).$$

Here, the a [mm] is a thickness of the flat part of the electrode group. The b [mm] is a total thickness of the negative electrode current collector in the flat part of the electrode group. The D [μm] is a thickness of the positive electrode. The E [μm] is a thickness of the negative electrode.

A lithium titanium composite oxide, included in a negative electrode layer of a negative electrode included in a wound electrode group according to the first embodiment, has a low electric conductivity in a low state-of-charge. The wound electrode group according to the first embodiment, however, satisfies the relational expressions (1) to (3), described above, and thus a resistance of the negative electrode can be reduced in the low state-of-charge. As a result, a nonaqueous electrolyte battery, using the wound electrode group according to the first embodiment, can easily take out current even at the last stage of discharge, and can increase capacity utilization efficiency. In addition, because the nonaqueous electrolyte battery using the wound electrode group according to the first embodiment satisfies the relational expressions (1) to (3) described above, a difference in the resistance between a part which is in contact with a negative electrode current collector and a part farthest from the negative electrode current collector in the negative electrode layer can be reduced in the negative electrode in the low state-of-charge. The nonaqueous electrolyte battery including the negative electrode, which exhibits the resistance leveled in the low state-of-charge, can reduce a load to the negative electrode current collector, which can lead to the prevention of the deterioration of the negative electrode current collector. As a result, the nonaqueous electrolyte battery using the wound electrode group according to the first embodiment can exhibit the excellent input-and-output characteristics in the low state-of-charge, and can further exhibit the excellent life characteristics.

A wound electrode group in which the ratio a/b is more than 16 is in the case including, for example, a case in which a thickness of the negative electrode current collector in a flat part is too thin, and a case in which a thickness of the negative electrode layer is too thick relative to that of the negative electrode current collector. The electrode groups described above have a high resistance of the negative electrode in the low state-of-charge. As a result, the input-and-output characteristics are decreased in the low state-of-charge. On the other hand, in the wound electrode group in which the ratio a/b is less than 10, it is difficult to form the negative electrode layer by applying slurry, thus resulting in the poor productivity.

The case in which the ratio D/E is more than 1.4 includes a case in which the thickness of the positive electrode is too large. In that case, the resistance of the positive electrode is too high, and in a nonaqueous electrolyte battery using such a wound electrode group, the input-and-output characteristics are deteriorated. The case in which the ratio D/E is more than 1.4 includes also a case in which the thickness of the negative electrode is too small. In that case, the battery capacity becomes small.

The case in which the ratio D/E is less than 0.7 includes a case in which the thickness of the negative electrode is too large. In that case, not only the resistance of the negative electrode is too high but also the resistance value of the negative electrode in the low state-of-charge is not uniform. As a result, in a nonaqueous electrolyte battery using such a wound electrode group, the input-and-output characteristics and the life characteristics are deteriorated. The case in which the ratio D/E is less than 0.7 also includes a case in which the thickness of the positive electrode is too small. In that case, the battery capacity becomes small.

When the thickness E of the negative electrode is more than 85 μm, the resistance of the negative electrode is high, and a nonaqueous electrolyte battery using such a wound electrode group exhibits the deteriorated input-and-output characteristics.

The ratio a/b is preferably from 10 to 14, more preferably from 10 to 13. The ratio of D/E is preferably from 0.75 to 1.4, more preferably 0.9 to 1.3. The thickness D of the positive electrode is preferably from 36 μm to 78 μm. The thickness E of the negative electrode is preferably from 40 μm to 60 μm.

Should be noted that a carbon material, which may be used as a negative electrode active material, can exhibit the excellent electric conductivity, regardless of the state-of-charge or discharge. For that reason, in the nonaqueous electrolyte battery using the carbon material as the negative electrode active material, even if the thickness a of the flat part, the total thickness b of the negative electrode current collector, the thickness D of the positive electrode, and the thickness E of the negative electrode in the electrode group are controlled as described above, it is impossible to improve the input-and-output characteristics in the low state-of-charge.

Furthermore, the wound electrode group according to the first embodiment can include the negative electrode layer having a small thickness. For that reason, when the nonaqueous electrolyte battery is produced using this wound electrode group, the number of winding per unit volume can be increased. It is possible to increase areas of the positive electrode and the negative electrode, which face each other, by increasing the number of winding. Thus, according to the wound electrode group of the first embodiment, accordingly, the nonaqueous electrolyte battery capable of exhibiting the more excellent output characteristics can be realized.

Here, the thickness a of the flat part, the total thickness b of the negative electrode current collector in the flat part, the thickness D of the positive electrode, and the thickness of E of the negative electrode, in the wound electrode group according to the first embodiment, are described in detailed referring to the drawings.

Figure 2:
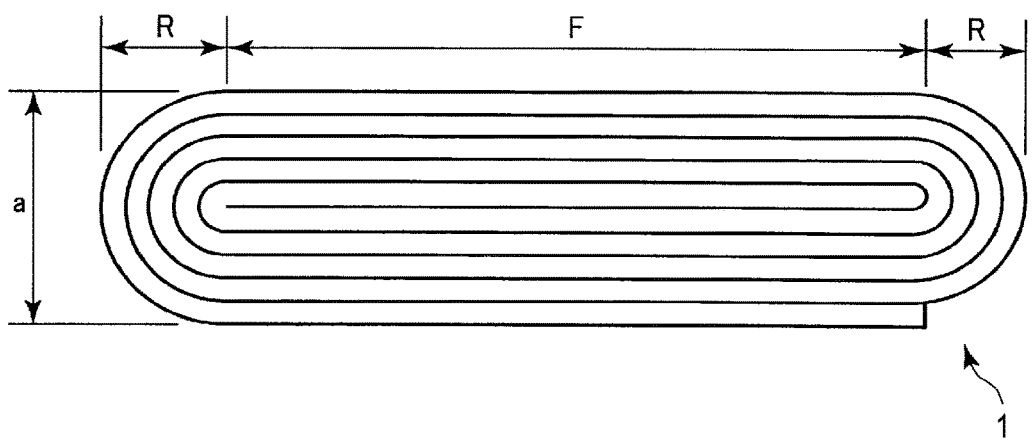
FIG. 2 is a schematic view showing the wound electrode group, which is observed from the A direction in FIG. 1.

FIG. 1 is a schematic perspective view showing a wound electrode group, which is one example according to the first embodiment. FIG. 2 is a schematic view showing the electrode group, which is observed from the A direction in FIG. 1. FIG. 3 is a schematic cross-sectional view showing a part of the electrode group shown in FIG. 1 and FIG. 2. Specifically, FIG. 3 is a schematic cross-sectional view showing a part of a flat part F of the electrode group 1 shown in FIG. 2. Some thicknesses shown in FIG. 3 are an average value of each layer in the flat part F of the electrode group 1.

An electrode group 1, shown in FIG. 1 and FIG. 2, has a wound structure. The electrode group 1 is wound with an insulating tape 11 in order to keep the wound state. The electrode group 1 includes, as shown in FIG. 3, a positive electrode 2, a negative electrode 3, and separators 4. The electrode group 1 is, as shown in FIG. 1 and FIG. 2, wound in a flat shape around a winding axis w. In the electrode group 1 shown in FIGS. 1 to 3, the positive electrode 2 includes a positive electrode current collector 21, and positive electrode layers 22 provided on both surfaces of the positive electrode current collector 21. The negative electrode 3 includes a negative electrode current collector 31, and negative electrode layers 32 provided on both surfaces of the negative electrode current collector 31. In the electrode group 1 shown in FIGS. 1 to 3, the positive electrode layer 22 faces the negative electrode layer 32 through the separator 4.

The thickness a of the flat part F in the electrode group 1 is, as shown in FIG. 2, a thickness of a part except for rounded parts R in the electrode group 1.

The thickness b of the negative electrode current collector is a total thickness of the negative electrode current collector 31 in the flat part F of the electrode group 1 shown in FIG. 2; in other words, the total thickness b of the negative electrode current collector 31 is a value obtained by multiplying an average value b' of the thickness of the negative electrode current collector shown in FIG. 3 by the number of layers of the negative electrode 3 included in the flat part F of the electrode group 1. In the example of the electrode group 1 shown in FIGS. 1 to 3, the total thickness b of the negative electrode current collector 31 is 10b'.

The thickness D of the positive electrode 2 is an average value of the thickness of the positive electrode 2 in the flat part F of the electrode group 1 shown in FIG. 2.

Similarly, the thickness E of the negative electrode 3 is an average value of the thickness of the negative electrode 3 in the flat part F of the electrode group 1 shown in FIG. 2.

As shown in FIG. 1 and FIG. 2, the electrode group 1 has a width W [mm] parallel to the winding axis w, and a height H [mm] perpendicular to the directions of the width W and the thickness a.

Next, a method for measuring the thickness a of the flat part of the electrode group included in the nonaqueous electrolyte battery, the total thickness b of the negative electrode current collector, the thickness D of the positive electrode, and the thickness E of the negative electrode are described.

First, the nonaqueous electrolyte battery is discharged up to the state of SOC 0%. Subsequently, the nonaqueous electrolyte battery whose battery charge depth is SOC 0% is disassembled under an argon atmosphere in a glove box. The electrode group is taken out from the disassembled nonaqueous electrolyte battery.

Next, the taken out electrode group is developed, and the number of layers of each of the positive electrodes, the negative electrodes, and the separators, included in the flat part of the electrode group is determined. Specifically, as shown in FIG. 4, the electrode group is developed a half round by a half round, and the number of the layers is counted so that one layer of the positive electrode, one layer of the negative electrode, and two layers of the separators are included every development of a half round (180°) in the flat part F. For example, when the electrode group can be developed 10 rounds up to the winding center, it is determined that the flat part of the electrode group includes 20 layers of the positive electrodes, 20 layers of the negative electrodes, and 40 layers of the separators.

Next, the developed electrode group is taken apart into the positive electrode, the negative electrode, and the separators.

Next, five of 2×2 cm² square samples are cut from arbitrary parts of the positive electrode taken apart. Thicknesses of center portions of the five samples cut are measured, and an average value D thereof is obtained. The thus obtained average value of the thicknesses of the positive electrode is defined as the thickness D of the positive electrode. The total thickness $D_{total}$ of the positive electrode is calculated by multiplying the thickness D of the positive electrode by the number of layers of the positive electrode, which has been previously determined.

Next, five of 2×2 cm² square samples are cut from arbitrary parts of the negative electrode taken apart. Thicknesses of center portions of the five samples cut are measured, and an average value E thereof is obtained. The thus obtained average value of the thicknesses of the negative electrode is defined as the thickness E of the negative electrode. The total thickness $E_{total}$ of the negative electrode is calculated by multiplying the thickness E of the negative electrode by the number of layers of the negative electrode, which has been previously determined.

Next, five of 2×2 cm² square samples are further cut from arbitrary parts of the negative electrode taken apart. Next, the negative electrode layers are removed from the 5 samples cut, whereby five samples of the negative electrode current collector are produced. Thicknesses of center portions of the five samples of the negative electrode current collector were measured, and an average value b' thereof is obtained. The product, obtained by multiplying the thus obtained value of the average thickness of the negative electrode current collector by the number of layers of the negative electrode, which has been previously determined, is defined as the total thickness b of the negative electrode current collector.

Next, five of 2×2 cm² square samples are cut from arbitrary parts of the separators taken apart. Thicknesses of center portions of the five samples cut are measured, and an average value s thereof is obtained. The total thickness $S_{total}$ of the separator is calculated by multiplying the thus obtained average value S of the thickness of the separator by the number of layers of the separator, which has been previously determined.

The total thickness $D_{total}$ of the positive electrode, total thickness $E_{total}$ of the negative electrode, and total thickness $S_{total}$ of the separator, which are thus obtained, are summed up, and the obtained sum is defined as the thickness a of the electrode group in the flat part.

When the thicknesses are measured, Digimatic Indicator capable of measuring about 0.5 μm minimum is used.

The five samples, taken out when the thickness D of the positive electrode and the thickness E of the negative electrode are calculated in the method described above, are cut from a part in which the positive electrode layers are provided on the both surfaces of the positive electrode and a part in which the negative electrode layers are provided on the both surfaces of the negative electrode, respectively; in other words, the average values, the thickness D of the positive electrode and the thickness E of the negative electrode, are calculated without using parts in which the electrode layer is provided on one surface thereof.

Next, the wound electrode group according to the first embodiment is described in more detailed.

The wound electrode group according to the first embodiment includes a positive electrode, a negative electrode, and a separator.

The positive electrode may include a positive electrode current collector, and a positive electrode layer(s) provided on one surface or both surfaces of the positive electrode current collector. The positive electrode current collector may include a part in which the positive electrode layer is not provided on the surface thereof. Such a part can serve as a positive electrode tab.

The positive electrode layer may include a positive electrode active material. The positive electrode layer may include a conductive agent and a binder, if necessary.

The negative electrode includes a negative electrode current collector, and a negative electrode layer provided on the negative electrode current collector. The negative electrode layer may be provided on one surface or both surfaces of the negative electrode current collector.

The negative electrode layer includes a lithium titanium composite oxide. The lithium titanium composite oxide can act as a negative electrode active material. The lithium titanium composite oxide may include, for example, lithium titanate having a spinel structure (for example, $Li_{4+x}Ti_5O_{12}$ wherein x can vary within a range of $0 \leq x \leq 3$ depending on the charge-and-discharge state); lithium titanate having a ramsdellite structure (for example, $Li_{2+y}Ti_3O_7$ wherein y can vary within a range of $0 \leq y \leq 3$ depending on the charge-and-discharge state), and the like. In the general formulae described above, the molar ratio of oxygen is formally described as 12 in the spinel type ($Li_{4+x}Ti_5O_{12}$), and as 7 in the ramsdellite type ($Li_{2+y}Ti_3O_7$), but the molar ratio of oxygen can vary due to influences such as oxygen non-stoichiometry.

In the instant specification, the lithium titanium composite oxide encompasses lithium titanium composite oxides in which a part of constituent elements of the lithium titanium composite oxide is substituted by a different element.

The lithium titanium composite oxide has preferably an Li-inserting potential of 0.4 V (vs. $Li/Li^+$) or more. In a negative electrode active material into which lithium is inserted at a potential less than 0.4 V (vs. $Li/Li^+$), as in, for example, graphite and lithium metal, metal lithium may deposit on the surface of the negative electrode by repeating input and output at a large current, and the metal lithium deposited may develop into dendrites.

The positive electrode, the negative electrode, and the separator are stacked so that the positive electrode layer faces the negative electrode layer through the separator. The thus formed stack is wound and pressed, whereby a wound electrode group is formed.

The positive electrode, the negative electrode, and the separator are described below.

1) Positive Electrode

As the positive electrode current collector, an aluminum foil or an aluminum alloy foil is preferably used, and the average crystal particle size is desirably 50 μm or less, more preferably 30 μm or less, even more preferably 5 μm or less. In the current collector formed of the aluminum foil or aluminum alloy foil having such an average crystal particle size, the strength can be dramatically increased, the densification of the positive electrode can be done by a high press pressure, and the battery capacity can be increased.

The average crystal particle size of the aluminum foil or aluminum alloy foil is complicatedly influenced by various factors such as a material composition, impurities, processing conditions, heat treatment history, and heating conditions of annealing, and the size can be controlled by combining the factors during production steps.

The aluminum foil and the aluminum alloy foil have preferably a thickness of 20 μm or less, more preferably 15 μm or less. The aluminum foil has preferably a purity of 99% or more. The aluminum alloy includes preferably an element of magnesium, zinc or silicon. On the other hand, it is preferable to adjust a content of a transition metal such as iron, copper, nickel or chrome to 1% or less.

The positive electrode active material is not particularly limited, and it is possible to use, for example, a mixture of a lithium-manganese composite oxide ($Li_xMn_2O_4$) and a lithium-cobalt composite oxide ($Li_yCoO_2$), which provides a high battery voltage. In the general formulae described above, x and y are preferably within ranges of $0 \leq x$ and $y \leq 1.1$. It is also possible to use a lithium-nickel-cobalt manganese composite oxide ($Li_zNi_{1-a-b}Co_a Mn_bM_cO_2$), which provides a high capacity though the voltage is low. In the general formula described above, it is preferable that $0.9 \leq z \leq 1.25$, $0 < a \leq 0.3$, $0 < b \leq 0.45$, and $0 \leq c \leq 0.1$, and M includes at least one element selected from the group consisting of Mg, Al, Si, Ti, Zn, Zr, Ca and Sn.

The binder is used if necessary, in order to bind the positive electrode active material, the conductive agent, and the positive electrode current collector. The binder may include, for example, polytetrafluoroethylene (PTFE), polyvinylidene fluoride (PVdF), fluororubber, styrene-butadiene rubber (SBR), carboxymethyl cellulose (CMC), polyimide, polyamide, and the like.

The positive electrode conductive agent is used if necessary, in order to improve the current collecting performance, and to suppress the contact resistance between the positive electrode active material and the positive electrode current collector. The positive electrode conductive agent may include, for example, acetylene black, carbon black, graphite, carbon fibers, carbon nanotubes, fullerene, and the like.

The positive electrode can be produced, for example, as described below. First, the positive electrode active material, the positive electrode conductive agent, and the binder are suspended in an appropriate solvent to prepare slurry. At that time, it is preferable that the positive electrode active material, the conductive agent, and the binder are mixed in a ratio of 80 to 95% by weight of the positive electrode active material, 3 to 18% by weight of the conductive agent, and 2 to 17% by weight of the binder. Next, the prepared slurry is coated on the positive electrode current collector, and the coating film is dried to obtain a positive electrode layer. Next, the positive electrode layer is pressed, whereby a positive electrode is obtained.

Alternatively, in the positive electrode, the positive electrode active material, the positive electrode conductive agent, and the binder are formed into pellets, and the resulting pellets may be used for a positive electrode active material-containing layer.

It is preferable to set the density of the positive electrode to 2.8 g/cc or more.

2) Negative Electrode

The negative electrode current collector is preferably an aluminum foil or aluminum alloy foil, which is electrochemically stable in a potential range nobler than 1.0 V.

The binder is used if necessary, in order to bind the negative electrode active material, the conductive agent, and the negative electrode current collector. The binder may include, for example, polytetrafluoroethylene (PTFE), polyvinylidene fluoride (PVdF), fluororubber, styrene-butadiene rubber (SBR), carboxymethyl cellulose (CMC), polyimide, polyamide, and the like.

The negative electrode conductive agent is used if necessary, in order to improve the current collecting performance, and to suppress the contact resistance between the negative electrode active material and the negative electrode current collector. The negative electrode conductive agent may include, for example, acetylene black, carbon black, graphite, carbon fibers, carbon nanotubes, fullerene, and the like.

The negative electrode can be produced, for example, as described below. First, the negative electrode active material, the negative electrode conductive agent, and the binder are suspended in an appropriate solvent to prepare slurry. At that time, it is preferable that the negative electrode active material, the conductive agent, and the binder are mixed in a ratio of 70 to 96% by weight of the negative electrode active material, 2 to 28% by weight of the conductive agent, and 2 to 28% by weight of the binder. When the conductive agent is added in a ratio of 2% by weight or more, the high current-collecting performance can be obtained, and thus the excellent large current property can be obtained. When the amount of the binder is less than 2% by weight, the binding property between the negative electrode layer and the negative electrode current collector is reduced, and the cycle characteristics are deteriorated. On the other hand, in order to make the capacity higher, it is preferable that the amounts of the negative electrode conductive agent and the binder are set to 28% by weight or less.

Then, the prepared slurry is coated on the negative electrode current collector, and the coating film is dried to obtain a negative electrode layer. Next, the negative electrode layer is pressed, whereby a negative electrode can be obtained.

Alternatively, the negative electrode may be produced in a manner in which the negative electrode active material, the negative electrode conductive agent, and the binder are formed into pellets, and the resulting pellets may be used as a negative electrode active material-containing layer.

It is preferable to set the density of the negative electrode to 2 g/cc or more.

3) Separator

The separator may include, for example, porous films containing polyethylene, polypropylene, cellulose or polyvinylidene fluoride (PVdF), unwoven fabrics produced from a synthetic resin, and the like.

In particular, the lithium-titanium composite oxide, included in the wound electrode group according to the first embodiment, can suppress the deposition of lithium dendrites during the charge and discharge, whereby the wound electrode group according to the first embodiment can use a non-woven fabric, which is thin and has a high porosity, as the separator. The wound electrode group according to the first embodiment can attain further improvement of the input-and-output characteristics of the nonaqueous electrolyte battery by using the non-woven fabric, which is thin and has a high porosity, as the separator.

In the wound electrode group according to the first embodiment, the a [mm], that is a thickness of the flat part of the electrode group, the b [mm], that is a total thickness of the negative electrode current collector in the flat part of the electrode group, the D [µm], is a thickness of the positive electrode, and the E [µm], is a thickness of the negative electrode, satisfies the relationship formula (1) of $10 \leq a/b \leq 16$; the relationship formula (2) of $0.7 \leq D/E \leq 1.4$; and the relationship formula (3) of $E \leq 85$. As a result, the wound electrode group according to the first embodiment can exhibit, in low state-of-charge, excellent input-and-output characteristics.

Second Embodiment

According to a second embodiment, a nonaqueous electrolyte battery is provided. This nonaqueous electrolyte battery includes the wound electrode group according to the first embodiment, and a nonaqueous electrolyte.

The electrode group can be impregnated with the nonaqueous electrolyte included in the nonaqueous electrolyte battery according to the second embodiment.

The nonaqueous electrolyte battery according to the second embodiment may further include a container member housing the electrode group and the nonaqueous electrolyte.

The container member may include a positive electrode terminal and a negative electrode terminal. The positive electrode terminal can be electrically connected to the positive electrode current collecting tab of the positive electrode, for example. The negative electrode terminal can be electrically connected to the negative electrode current collecting tab of the negative electrode, for example. The positive electrode current collecting tab can be a part of the positive electrode current collector as described above, or a separate member from the positive electrode current collector. Similarly, the negative electrode current collecting tab can be a part of the negative electrode current collector as described above, or a separate member from the negative electrode collect collector.

The nonaqueous electrolyte, the container member, the positive electrode terminal, the negative electrode terminal will be described below.

(1) Nonaqueous Electrolyte

As the nonaqueous electrolyte, a liquid nonaqueous electrolyte that is prepared by dissolving an electrolyte in a nonaqueous solvent, and a gel nonaqueous electrolyte that is composite of a liquid nonaqueous electrolyte and polymer material can be included.

The electrolyte may include, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bis (trifluoromethanesulfonyl) imide ($LiN(CF_3SO_2)_2$). One electrolyte among these electrolytes may be used alone or a mixture of two or more electrolytes may be used.

The electrolyte is preferably dissolved in the nonaqueous solvent in amount within a range of 0.5 mol/L to 2.5 mol/L.

The nonaqueous solvent may include, for example, cyclic carbonate such as ethylene carbonate (EC), propylene carbonate (PC), and vinylene carbonate (VC); chain carbonate such as dimethyl carbonate (DMC), methylethyl carbonate (MEC), diethyl carbonate (DEC); cyclic ether such as tetrahydrofuran (THF) and 2-methyltetrahydrofuran (2-MeHF); chain ether such as dimetoxyethane (DME); γ-butyrolactone (BL); acetonitrile; sulpholane; and the like. One nonaqueous solvent among these organic solvents may be used alone or a mixture of two or more solvents may be used.

As polymer material used for the gel nonaqueous electrolyte, polyvinylidene fluoride (PVdF), polyacrylonitrile (PAN), polyethylene oxide (PEO) or the like can be included.

(2) Container Member

As the container member, a laminate film having a wall thickness of 0.2 mm or less, and a metal container having a wall thickness of 0.5 mm or less. The wall thickness is more preferably 0.2 mm or less. Examples of the shape of the container member may include a flat type, rectangular type, cylindrical type, coin type, button type, sheet type, a stack type, and the like. Should be noted that the shape may be, of course, one for a small-size battery installed in a portable electric device and the like, or one for a large-size battery installed in a two- or four-wheeled vehicle.

As the laminated film, a multi-layered film in which metal layer is sandwiched between resin films can be used, for example. For weight saving, the metal layer is preferably aluminum foil or aluminum alloy foil. Polymers such as polypropylene (PP), polyethylene (PE), nylon, and polyethylene terephthalate (PET) can be used in the resin film. The laminate film can be heat-sealed to form the shape of the container member.

As the metal container, one made from aluminum, or aluminum alloy, and the like can be used. Aluminum alloys are preferably alloys including elements such as magnesium, zinc, silicon and the like. The content of transition metals such as iron, copper, nickel, chromium and the like in aluminum or aluminum alloy is preferably not larger than 100 ppm. Thus, long-term reliability under a high-temperature environment and a heat-releasing property can be dramatically improved.

The metal container of the aluminum or aluminum alloy desirably have an average crystal grain size of 50 μm or less, more preferably 30 μm or less, further preferably 5 μm or less. By setting the average crystal grain size to 50 μm or less, the strength of the metal container of the aluminum or aluminum alloy may be dramatically increased. This make it possible to make the wall thickness of the container further small. As a result, the nonaqueous electrolyte battery can be achieved that has a light weight, exhibits high output and excellent long-term reliability, and can be suitably installed in a vehicle.

(3) Positive Electrode Terminal and Negative Electrode Terminal

The positive electrode terminal can be electrically connected to the positive electrode, directly or via, for example, a positive electrode lead. To reduce contact resistance, materials of members, which are directly connected to each other, are preferably the same.

Similarly, the negative electrode terminal can be electrically connected to the negative electrode, directly or via, for example, a negative electrode lead. To reduce contact resistance, materials of members, which are directly connected to each other, are preferably the same.

Next, some examples of the nonaqueous electrolyte battery according to the second embodiment will be described in detailed referring to the drawings.

At first, a first example of the nonaqueous electrolyte battery according to the second embodiment will be described referring to FIG. 5 and FIG. 6.

Figure 5:
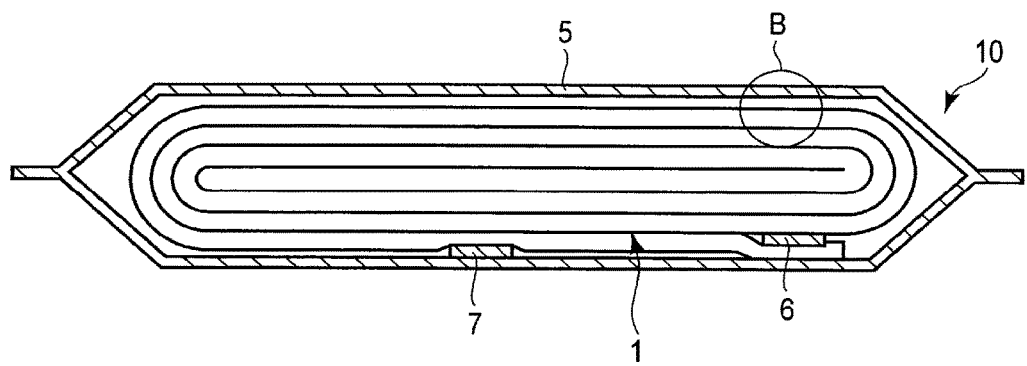
FIG. 5 is a schematic cross-sectional view showing a nonaqueous electrolyte battery, which is one example according to a second embodiment.

FIG. 5 is a schematic cross-sectional view showing a nonaqueous electrolyte battery, which is one example according to a second embodiment. FIG. 6 is an enlarged cross-sectional view showing the B part in FIG. 5.

Figure 6:
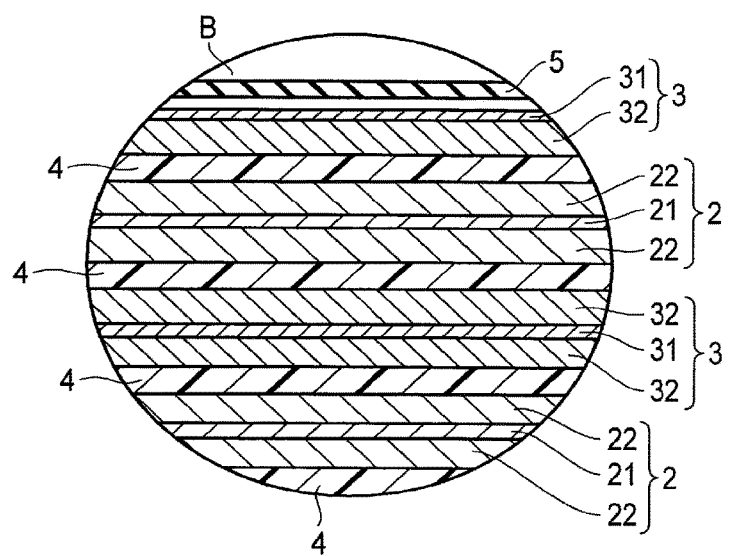
FIG. 6 is an enlarged cross-sectional view showing the B part in FIG. 5.

A nonaqueous electrolyte battery 10 shown in FIGS. 5 and 6 includes a wound electrode group 1 and a nonaqueous electrolyte (not shown).

The wound electrode group 1 includes a positive electrode 2, a negative electrode 3, and a separator 4, as shown in FIG. 6. The positive electrode 2 includes a positive electrode current collector 21 and a positive electrode layer 22 provided on the positive electrode current collector 21. The negative electrode 3 includes a negative electrode current collector 31 and a negative electrode layer 32 provided on the negative electrode current collector 31. In a part, which is located at the outermost layer, of the negative electrode, the negative electrode layer 32 is provided on one surface of the negative electrode current collector, as shown in FIG. 6. In other parts of the negative electrode, the negative electrode layer 32 is provided on both surfaces of the negative electrode current collector. In the electrode group 1, as shown in FIG. 6, the positive electrode 2 and the negative electrode 3 constitute a stack with separator 4. Specifically, the positive electrode layer 22 and the negative electrode layer 32 faces to each other through the separator 4 sandwiched therebetween.

As shown in FIG. 5, in the vicinity of the outer peripheral edge of the wound electrode group 1, a negative electrode terminal 7 is connected to the negative electrode current collector 31 located at outermost, and a positive electrode terminal 6 is connected to the positive electrode current collector 21 located at the inside.

As shown in FIG. 5, the electrode group 1 is housed in the container member 5. Although not shown, the nonaqueous electrolyte is also housed in the container member 5 where the electrode group 1 is impregnated with the nonaqueous electrolyte.

A part of each of the positive electrode terminal 6 and the negative electrode terminal 7 connected to the electrode group 1 is extended out from the container member 5.

Next, a second example of the nonaqueous electrolyte battery according to the second embodiment will be described referring to FIG. 7 and FIG. 8.

Figure 7:
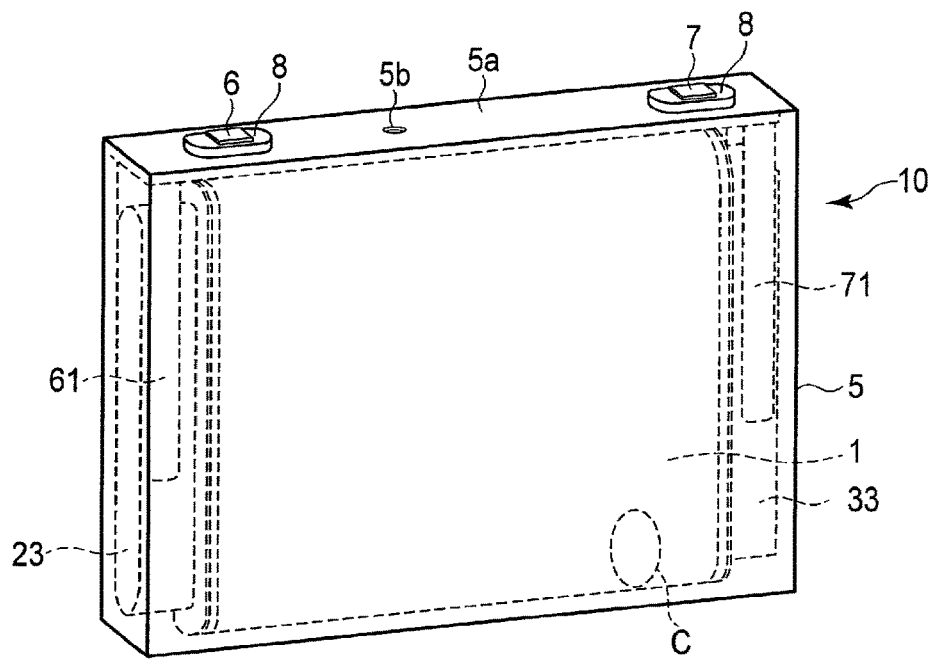
FIG. 7 is a schematic transparent perspective view showing a nonaqueous electrolyte battery, which is another example according to the second embodiment.

FIG. 7 is a schematic transparent perspective view showing a nonaqueous electrolyte battery, which is another example according to the second embodiment. FIG. 8 is an enlarged cross-sectional view showing the C part in FIG. 7.

Figure 8:
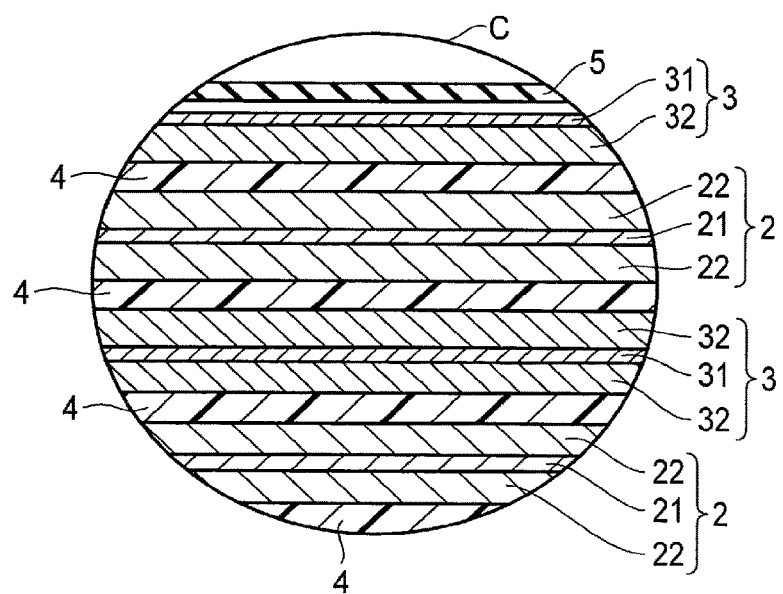
FIG. 8 is an enlarged cross-sectional view showing the C part in FIG. 7.

A nonaqueous electrolyte battery 10 shown in FIGS. 7 and 8 includes a wound electrode group 1 and a nonaqueous electrolyte (not shown).

Similarly to the electrode group 1 included in the nonaqueous electrolyte battery 10 shown in FIGS. 5 and 6, the wound electrode group 1 has a structure in which a positive electrode 2, a negative electrode 3, and a separator 4 are stacked, as shown in FIG. 8. Regarding to the detailed description of the positive electrode 2, the negative electrode 3 and a separator 4, the description of the first example of the nonaqueous electrolyte battery should be referred.

In the electrode group 1 shown in FIGS. 7 and 8, a part 23, a surface of which does not support the positive electrode layer 22, of the positive electrode current collector 21 is protruded from the electrode group 1. The part 23 serves as a positive electrode current collecting tab. Similarly, a part 33, a surface of which does not support the negative electrode layer 32, of the negative electrode current collector 31 is protruded from the electrode group 1. The part 33 serves as a negative electrode current collecting tab. The positive electrode current collecting tab 23 and negative electrode current collecting tab 33 are protruded from the electrode group 1 reversely from each other.

The nonaqueous electrolyte battery 10 shown in FIGS. 7 and 8 further includes the positive electrode lead 61 and the negative electrode lead 71. As shown in FIG. 7, the positive electrode lead 61 sandwiches the positive electrode current collecting tab 23, and is electrically connected to this. Similarly, the negative electrode lead 71 sandwiches the negative electrode current collecting tab 33, and is electrically connected to this.

The nonaqueous electrolyte battery 10 shown in FIGS. 7 and 8 further includes the container member 5 having rectangular shape with a bottom. The wound electrode group 1, the positive electrode lead 61, and the negative electrode lead 71 are housed in the container member 5.

The container member 5 includes a lid 5a. Into the lid 5a, each of the positive electrode terminal 6 and the negative electrode terminal 7 is inserted via a hermetic seal using a glass material 8. The positive electrode terminal 6 is electrically connected to the positive electrode lead 61. The negative electrode terminal 7 is electrically connected to the negative electrode lead 71. The lid 5a also includes a liquid inlet 5b. The liquid inlet 5b is sealed with a sealant (not shown) after the nonaqueous electrolyte is injected into the container member 5.

The nonaqueous electrolyte battery according to the second embodiment includes the wound electrode group according to the first embodiment. Thus, the battery can exhibit excellent input-and-output characteristics in low state-of-charge and further exhibit excellent life characteristics.

Furthermore, the nonaqueous electrolyte battery according to the second embodiment is such a nonaqueous electrolyte battery that can exhibit long lifetime and excellent safety, and can be suitably used as a battery installed in a vehicle.

Third Embodiment

According to a third embodiment, an electrode group is provided. The electrode group includes a stack. The stack includes a positive electrode, a negative electrode or negative electrodes, and separator. The electrode or each of the negative electrodes includes a negative electrode current collector and a negative electrode layer provided on the negative electrode current collector. The negative electrode layer includes a lithium titanium composite oxide. The electrode group according to the third embodiment satisfies following relational formulae (I) to (III):

$$10 \leq a_1/b_1 \leq 16 \quad \text{(I)};$$

$$0.7 \leq D_1/E_1 \leq 1.4 \quad \text{(II); and}$$

$$E_1 \leq 85 \quad \text{(III).}$$

Here, the $a_1$ [mm] is a thickness of the stack. The $b_1$ [mm] is a thickness of the negative electrode current collector when the stack includes the negative electrode, or is a total thickness of the negative electrode current collectors when the stack includes the negative electrodes. The $D_1$ [μm] is a thickness of the positive electrode. The $E_1$ [μm] is a thickness of the negative electrode.

As a result of earnest studies, the present inventors have found that the relational formulae (I) to (III), described above, which is similar to the relational formulae (1) to (3) in the wound electrode group according to the first embodiment, can be applied to electrode groups, which is not limited to those having the wound structure.

That is, the electrode group according to the third embodiment can decrease the resistance of the negative electrode in the low state-of-charge, because it satisfies the relational formulae (I) to (III), which are similar to the relational formulae (1) to (3) in the wound electrode group according to the first embodiment. As a result, a nonaqueous electrolyte battery using the electrode group according to the third embodiment can easily take out current even at the last stage of discharge, and can increase a capacity utilization efficiency. In addition, because the nonaqueous electrolyte battery using the electrode group according to the third embodiment satisfies the relational formulae (I) to (III) described above, a difference in the resistance between a part which is in contact with a negative electrode current collector and a part farthest from the negative electrode current collector in the negative electrode layer can be reduced in the negative electrode in the low state-of-charge. The nonaqueous electrolyte battery including the negative electrode, which exhibits the resistance leveled in the low state-of-charge, can reduce a load to the negative electrode current collector, which can lead to the prevention of the deterioration of the negative electrode current collector. As a result, the nonaqueous electrolyte battery using the electrode group according to the third embodiment can exhibit the excellent input-and-output characteristics in the low state-of-charge, and can further exhibit the excellent life characteristics.

A electrode group, in which the ratio $a_1/b_1$ is more than 16, includes, for example, a case in which a thickness of the negative electrode current collector in the stack is too small, or a case in which a thickness of the negative electrode layer is too large relative to that of the negative electrode current collector. The electrode groups described above have a high resistance of the negative electrode in the low state-of-charge. As a result, the input-and-output characteristics are decreased in the low state-of-charge. On the other hand, in the electrode group, in which the ratio $a_1/b_1$ is less than 10, it is difficult to form the negative electrode layer by coating slurry, thus resulting in the poor productivity.

The case in which the ratio $D_1/E_1$ is more than 1.4 includes a case in which the thickness of the positive electrode is too large. In that case, the resistance of the positive electrode is too high, and in a nonaqueous electrolyte battery using such an electrode group, the input-and-output characteristics are deteriorated. The case in which the ratio $D_1/E_1$ is more than 1.4 includes also a case in which the thickness of the negative electrode is too small. In that case, the battery capacity becomes small.

The case in which the ratio $D_1/E_1$ is less than 0.7 includes a case in which the thickness of the negative electrode is too large. In that case, not only the resistance of the negative electrode is too high but also the resistance value of the negative electrode in the low state-of-charge is not uniform. As a result, in a nonaqueous electrolyte battery using such an electrode group, the input-and-output characteristics and the life characteristics are deteriorated. The case in which the ratio $D_1/E_1$ is less than 0.7 also includes a case in which the thickness of the positive electrode is too small. In that case, the battery capacity becomes small.

When the thickness $E_1$ of the negative electrode is more than 85 μm, the resistance of the negative electrode is high, and in a nonaqueous electrolyte battery using such an electrode group, the input-and-output characteristics are deteriorated.

The ratio $a_1/b_1$ is preferably from 10 to 14, more preferably from 10 to 13. The ratio of $D_1/E_1$ is preferably from 0.75 to 1.4, more preferably 0.9 to 1.3. The thickness $D_1$ of the positive electrode is preferably from 36 μm to 78 μm. The thickness $E_1$ of the negative electrode is preferably from 40 μm to 60 μm.

Should be noted that a carbon material, which may be used as a negative electrode active material, can exhibit the excellent electric conductivity, regardless of the state-of-charge or discharge. For that reason, in the nonaqueous electrolyte battery using the carbon material as the negative electrode active material, even if the thickness $a_1$ of the flat part, the total thickness $b_1$ of the negative electrode current collector, the thickness $D_1$ of the positive electrode, and the thickness $E_1$ of the negative electrode in the electrode group are controlled as described above, it is impossible to improve the input-and-output characteristics in the low state-of-charge.

The electrode group of the third embodiment may be, for example, a stacked electrode group. The stacked electrode group can include, for example, a stack including a positive electrode or the positive electrodes, a negative electrode or negative electrodes, and a separator or separators. The positive electrode can face the negative electrode through the separator.

The stacked electrode group, which is one aspect of the third embodiment, can include a thin negative electrode layer. For that reason, the stacked electrode group of this aspect can contain a stack including more layers of the positive electrode and the negative electrode per unit volume. According to the stacked electrode group, which is one aspect according to the third embodiment, a nonaqueous electrolyte battery capable of exhibiting the more excellent output characteristics can be realized.

Alternatively, the electrode group according to the third embodiment may be, for example, a wound electrode group.

Here, the thickness $a_1$ of the stack, the total thickness $b_1$ of the negative electrode current collector, the thickness $D_1$ of the positive electrode, and the thickness of $E_1$ of the negative electrode, in the stacked electrode group, which is one aspect according to the third embodiment, are described in detailed referring to the drawings.

Figure 9:
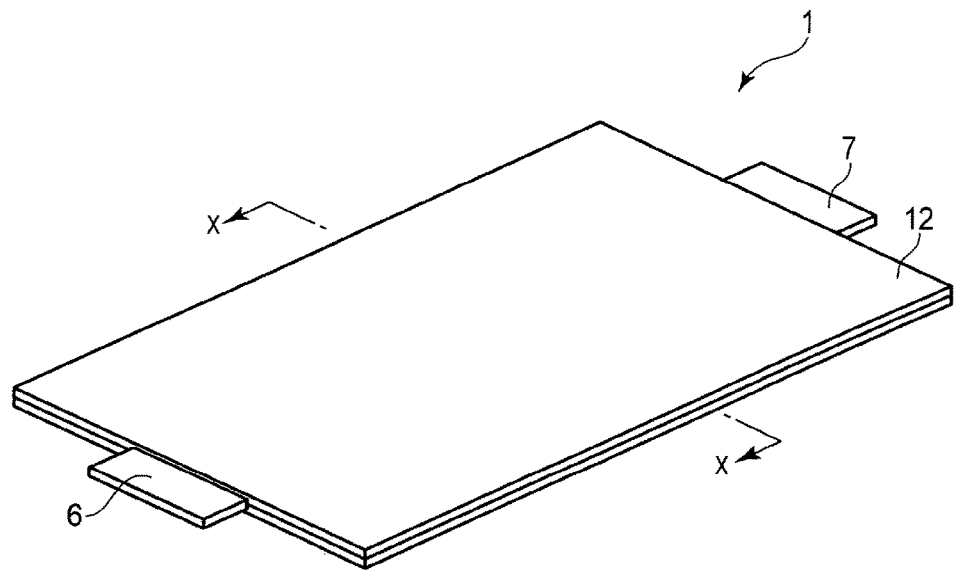
FIG. 9 is a schematic perspective view showing an electrode group, which is one example according to a third embodiment.
Figure 10:
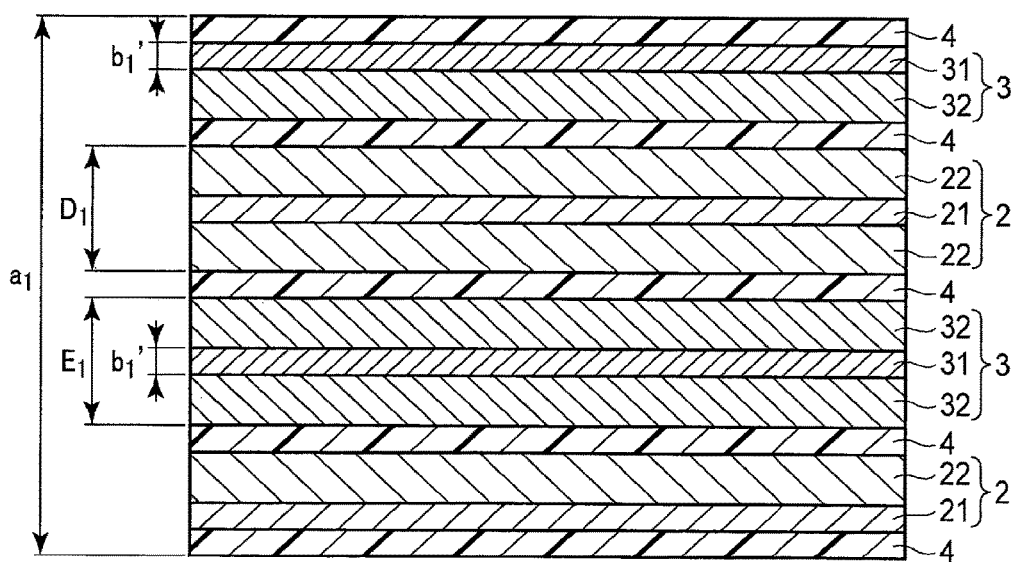
FIG. 10 is a schematic cross-sectional view showing the electrode group in FIG. 9 at the line X-X.

FIG. 9 is a schematic perspective view showing an electrode group, which is one example according to the third embodiment. FIG. 10 is a schematic cross-sectional view showing the electrode group in FIG. 9 at the line X-X.

The electrode group 1, shown in FIG. 9 and FIG. 10, has a stacked structure. The electrode group 1 includes, as shown in FIG. 10, two layers of the positive electrode 2, two layers of the negative electrode 3, and five layers of the separator 4.

In a stack 12 of the electrode group 1, shown in FIG. 9 and FIG. 10, one of the positive electrodes 2 includes a positive electrode current collector 21, and positive electrode layers 22 provided on both surfaces of the positive electrode current collector 21. The other positive electrode 2 includes a positive electrode current collector 21, and a positive electrode layer 22 provided on one surface of the of the positive electrode current collector 21. One of the negative electrodes 3 includes a negative electrode current collector 31, and negative electrode layers 32 provided on both surfaces of the negative electrode current collector 31. The other negative electrode 3 includes a negative electrode current collector 31, and a negative electrode layer 32 provided on one surface of the negative electrode current collector 31. In the stack 12 of the electrode group 1, shown in FIGS. 9 and 10, the two positive electrodes 2, the two negative electrodes 3, and the five separators 4 are stacked so that the positive electrode layer 22 faces the negative electrode layer 32 through the separator 4. In addition, as shown in FIG. 10, the separators 4 are provided as the top layer and the bottom layer of the stack: The bottom layer of the separator 4 is in contact with the positive electrode current collector 21 of the positive electrode 2 on which the positive electrode layer 22 is provided on one surface thereof. The top layer of the separator 4 is in contact with the negative electrode current collector 31 of the negative electrode 3 on which the negative electrode layer 32 is provided on one surface thereof.

In the electrode group shown in FIGS. 9 and 10, the thickness $b_1$ of the negative electrode current collector is a total thickness of the negative electrode current collectors 31; in other words, the total thickness $b_1$ of the negative electrode current collector 31 is a value obtained by multiplying an average value $b_1'$ of the thickness of the negative electrode current collector shown in FIG. 10 by the number of layers of the negative electrode 3 included in the stack of the electrode group 1. In the example of the electrode group 1 shown in FIGS. 9 and 10, the total thickness $b_1$ of the negative electrode current collector 31 is $2b_1'$.

The thickness $D_1$ of the positive electrode 2 is an average value of the thicknesses of the positive electrodes 2 of the stack 12 of the electrode group 1 shown in FIG. 10. Should be noted that, as described above, the thickness of the positive electrode 2 is an average value of a part, in which the positive electrode layers are provided on the both surfaces of the positive electrode current collector, of the positive electrode, and thus, for example, the thickness of the undermost layer of the positive electrode 2, shown in FIG. 10, is not used in the calculation of the thickness $D_1$.

Similarly, the thickness $E_1$ of the negative electrode 3 is an average value of the thicknesses of the negative electrodes 3 of the stack 12 of the electrode group 1 shown in FIG. 10. Should be noted that as described above, the thickness of the negative electrode 3 is an average value of a part, in which the negative electrode layers are provided on the both surfaces of the negative electrode current collector, of the negative electrode, and thus, for example, the thickness of the uppermost layer of the negative electrode 3, shown in FIG. 10, is not used in the calculation of the thickness $E_1$.

The electrode group 1, shown in FIGS. 9 and 10, further contains a positive electrode terminal 6 and a negative electrode terminal 7. The positive electrode terminal 6 is electrically connected to the positive electrode current collector 21, which is not shown in the drawings, though. Similarly, the negative electrode terminal 7 is electrically connected to the negative electrode current collector 31, which is not shown in the drawings, though.

Each size of the stacked electrode group can be measured in the same manner as described in the first embodiment above, except that the numbers of layers of the positive electrode, the negative electrode, and the separator are determined from the cross-section.

Should be noted that the electrode group according to the third embodiment is not limited to the electrode group including the multiple layers of the negative electrode, as shown in FIGS. 9 and 10. For example, the electrode group according to the third embodiment may include one layer of the negative electrode. In that case, the thickness $b_1$ of the negative electrode current collector is a thickness [mm] of the one layer of the negative electrode current collector.

The positive electrode, the negative electrode, and the separator, which can be used in the electrode group according to the third embodiment, are the same as used in the wound electrode group according to the first embodiment.

In the electrode group according to the third embodiment, the $a_1$ [mm], that is a thickness of the stack, the $b_1$ [mm], that is a thickness of the negative electrode current collector or is a total thickness of the negative electrode current collectors, the $D_1$ [μm], that is a thickness of the positive electrode, and the $E_1$ [μm], that is a thickness of the negative electrode, satisfies the relational formula (I) of $10 \leq a_1/b_1 \leq 16$; the relational formula (II) of $0.7 \leq D_1/E_1 \leq 1.4$; and the relational formula (III) of $E_1 \leq 85$. As a result, the electrode group according to the third embodiment can exhibit excellent input-and-output characteristics in a low state-of-charge.

Fourth Embodiment

According to a fourth embodiment, a nonaqueous electrolyte battery is provided. The nonaqueous electrolyte battery includes the electrode group according to the third embodiment, and a nonaqueous electrolyte.

The electrode group can be impregnated with the nonaqueous electrolyte included in the nonaqueous electrolyte battery according to the fourth embodiment.

The nonaqueous electrolyte battery according to the fourth embodiment may further include a container member. The container member may house the electrode group and the nonaqueous electrolyte.

The container member may include a positive electrode terminal and a negative electrode terminal. The positive electrode terminal may be connected to, for example, a positive electrode current-collecting tab of the positive electrode. The negative electrode terminal may be connected to, for example, a negative electrode current-collecting tab of the negative electrode. The positive electrode current-collecting tab may be a part of the positive electrode current collector as described above or a separate member from the positive electrode current collector. Similarly, the negative electrode current-collecting tab may be a part of the negative electrode current collector as described above or a separate member from the negative electrode current collector.

The nonaqueous electrolyte, the container member, the positive electrode terminal, and the negative electrode terminal, which can be used in the nonaqueous electrolyte battery according to the fourth embodiment, are the same as used in the nonaqueous electrolyte battery according to the second embodiment.

Next, referring to the drawings, an example of the nonaqueous electrolyte battery according to the fourth embodiment is described in more detailed.

FIG. 11 is a schematic transparent perspective view showing a nonaqueous electrolyte battery, which is one example according to the fourth embodiment.

The nonaqueous electrolyte battery 10, shown in FIG. 11, includes an electrode group 1, a nonaqueous electrolyte, which is not shown in the drawing, and a container member 5.

The electrode group 1 is the stacked electrode group 1, which has been described referring to FIGS. 9 and 10.

The electrode group 1 is housed in the container 5 in the state in which a part of each of the positive electrode terminal 6 and the negative electrode terminal 7 is drawn out from the container material 5. The nonaqueous electrolyte (though not shown) is also housed in the container member 5, and the electrode group 1 is impregnated therewith.

The structure of the nonaqueous electrolyte battery according to the fourth embodiment is not limited to that shown in FIG. 11. For example, the nonaqueous electrolyte battery according to the fourth embodiment may have the same structure as shown in FIGS. 5 and 6, or the same structure as shown in FIGS. 7 and 8.

The nonaqueous electrolyte battery according to the fourth embodiment includes the electrode group according to the third embodiment, and thus it can exhibit the excellent input-and-output characteristics in the low state-of-charge, and further can exhibit the excellent life characteristics.

In addition, the nonaqueous electrolyte battery according to the fourth embodiment is such a nonaqueous electrolyte battery that can exhibit the long lifetime and the excellent safety, and can be suitably used as a battery installed in a vehicle.

EXAMPLES

Examples are described below. In Examples and Comparative Examples described below, nonaqueous electrolyte batteries having the same mass were produced.

Comparative Example 1

In Comparative Example 1, a nonaqueous electrolyte battery 10, shown in FIGS. 5 and 6, was produced in procedures shown below.

<Production of Positive Electrode>

75% by weight of a powder of a lithium-manganese oxide ($LiMn_2O_4$) as a positive electrode active material, 18% by weight of a powder of a lithium-cobalt oxide ($LiCoO_2$) as a positive electrode active material, 2% by weight of acetylene black as a conductive agent, 2% by weight of graphite as a conductive agent, and 3% by weight of polyvinylidene fluoride (PVdF) as a binder were put into N-methylpyrrolidone (NMP) as the solvent, and were mixed to prepare a slurry. The slurry was coated on both surfaces of a positive electrode current collector 21 formed of an aluminum foil having a thickness of 15 μm and an average crystal particle size of 30 μm. The coating weight of the coated film was set to 150 g/m² per one surface. After that, the coated films were dried to obtain positive electrode layers 22. The positive electrode layers 22 were pressed together with the positive electrode current collector 21, whereby a pressed positive electrode 2 was produced.

<Production of Negative Electrode>

As the negative electrode active material, a lithium titanate, represented by $Li_4Ti_5O_{12}$, having a spinel structure whose Li-insertion potential was 1.55 V (vs. Li/Li⁺) was provided. 91% by weight of the negative electrode active material, 5% by weight of graphite as a conductive agent, and 4% by weight of polyvinylidene fluoride (PVdF) as a binder, were added to N-methylpyrrolidone (NMP) as a solvent, and mixed to prepare a slurry. The slurry was coated on both sides of a negative electrode current collector 31 formed of an aluminum foil having a thickness of 15 μm and an average crystal particle size of 30 μm. The coating weight of the coated film was set to 80 g/m² per one surface. After that, the coated films were dried to obtain negative electrode layers 32. The negative electrode layers 32 were pressed together with the negative electrode current collector 31, whereby a pressed negative electrode 3 was produced.

<Production of Electrode Group>

Then, two belt-shaped separators 4, formed of a porous cellulose film and having a thickness of 20 μm, were provided. The separators 4 were non-woven fabrics.

The positive electrode 2, produced as above, one of the separators 4, the negative electrode 3, produced as above, and the other separator 4 were stacked in this order to obtain a stack 12. The stack was spirally wound. The wound stack was heat-pressed at about 120° C. to produce an electrode group 1. The obtained electrode group 1 was housed in a container material 5, which was subjected to vacuum drying at about 95° C. for 8 hours.

The obtained electrode group 1 had a width W, parallel to a winding axis w shown in FIG. 1, of 108 mm and a height H, perpendicular to directions of the winding axis w and a thickness a shown in FIG. 1, of 73.63 mm.

<Preparation of Liquid Nonaqueous Electrolyte>

In a mixed solvent of propylene carbonate (PC) and diethyl carbonate (DEC) in a volume ratio of 30:70 were dissolved lithium hexafluorophosphate ($LiPF_6$) in a concentration of 1.0 mol/L and lithium tetrafluoroborate ($LiBF_4$) in a concentration of 0.5 mol/L, which were the electrolyte, to prepare a liquid nonaqueous electrolyte.

<Production of Nonaqueous Electrolyte Battery>

After injection of the liquid nonaqueous electrolyte, complete sealing was performed, thereby producing a nonaqueous electrolyte battery 10 of Comparative Example 1.

Should be noted that, in the press of the positive electrode 2, the press of the negative electrode 3, and the press of the electrode group 1, as described above, the press was performed in conditions adjusted to so that the thickness a of flat part F in the electrode group 1, the total thickness b of the negative electrode current collector 31 in the flat part F, the thickness D of the positive electrode, and the thickness E of the negative electrode were values shown in Table 1 below. In each of Examples and Comparative Example described below, press conditions were also adjusted so that each thickness was a value shown in Table 1.

Comparative Example 2

In Comparative Example 2, a nonaqueous electrolyte battery 10 of Comparative Example 2 was produced in the same procedures as in Comparative Example 1 except for the following points. In Comparative Example 2, 75% by weight of a powder of a lithium nickel cobalt manganese oxide as a positive electrode active material, 18% by weight of a powder of a lithium cobalt oxide ($LiCoO_2$) as the positive electrode active material, 2% by weight of acetylene black as a conductive agent, 2% by weight of graphite as a conductive agent, and 3% by weight of polyvinylidene fluoride (PVdF) as a conductive agent were added to N-methylpyrrolidone (NMP) as a solvent and mixed to prepare a slurry. In addition, the coating weight of the coated film of the positive electrode slurry was set to 100 g/m² per one surface. The coating weight of the coated film of the negative electrode slurry was adjusted to 100 g/m² per one surface.

The electrode group 1 of the nonaqueous electrolyte battery 10 of Comparative Example 2 had a width W, parallel to the winding axis w shown in FIG. 1, of 111 mm, and a height H, perpendicular to the directions of winding axis w and the thickness a shown in FIG. 1, of 95.66 mm.

Example 1

In Example 1, a nonaqueous electrolyte battery 10 of Example 1 was produced in the same procedures as in Comparative Example 1 except that the coating weight of the coated film of the positive electrode slurry was adjusted to 60 g/m² per one surface, and the coating weight of the coated film of the negative electrode slurry was adjusted to 35 g/m² per one surface.

The electrode group 1 of the nonaqueous electrolyte battery 10 of Example 1 had a width W, parallel to the winding axis w shown in FIG. 1, of 111 mm, and a height H, perpendicular to the directions of winding axis w and the thickness a shown in FIG. 1, of 95.10 mm.

Example 2

In Example 2, a nonaqueous electrolyte battery 10 of Example 2 was produced in the same procedures as in Comparative Example 1 except that the coating weight of the coated film of the positive electrode slurry was adjusted to 60 g/m² per one surface, and the coating weight of the coated film of the negative electrode slurry was adjusted to 40 g/m² per one surface.

The electrode group 1 of the nonaqueous electrolyte battery 10 of Example 2 had a width W, parallel to the winding axis w shown in FIG. 1, of 108 mm, and a height H, perpendicular to the directions of winding axis w and the thickness a shown in FIG. 1, of 73.58 mm.

Example 3

In Example 3, a nonaqueous electrolyte battery 10 of Example 3 was produced in the same procedures as in Comparative Example 2 except that the coating weight of the coated film of the positive electrode slurry was adjusted to 50 g/m² per one surface, and the coating weight of the coated film of the negative electrode slurry was adjusted to 40 g/m² per one surface.

The electrode group 1 of the nonaqueous electrolyte battery 10 of Example 3 had a width W, parallel to the winding axis w shown in FIG. 1, of 111 mm, and a height H, perpendicular to the directions of winding axis w and the thickness a shown in FIG. 1, of 95.03 mm.

Example 4

In Example 4, a nonaqueous electrolyte battery 10 of Example 4 was produced in the same procedures as in Comparative Example 2 except that the coating weight of the coated film of the positive electrode slurry was adjusted to 80 g/m² per one surface, and the coating weight of the coated film of the negative electrode slurry was adjusted to 75 g/m² per one surface.

The electrode group 1 of the nonaqueous electrolyte battery 10 of Example 4 had a width W, parallel to the winding axis w shown in FIG. 1, of 111 mm, and a height H, perpendicular to the directions of winding axis w and the thickness a shown in FIG. 1, of 95.27 mm.

(Output Test in Low SOC)

The nonaqueous electrolyte batteries 10 of Examples 1 to 4 and Comparative Examples 1 and 2 were subjected to an output test in a low SOC (low state-of-charge) in the following procedures.

First, the battery was adjusted to SOC 20% in a 25° C. environment. Next, the battery in SOC 20% was subjected to a discharge test at a current of 1 C up to 1.8 V in the 25° C. environment. During the discharge, a voltage was measured when the discharge was performed for 10 seconds.

Here, a current value, obtained by dividing a discharge capacity (Ah) obtained by charging the battery at a constant current of 1.0 A in the 25° C. environment until the battery voltage reached 2.8 V, and then discharging the battery at a constant voltage of 2.8 V for one hour, and discharging the battery at a constant current of 1.0 A until the battery voltage reached 1.8 V by one hour, was decided as 1 C (A).

Next, the battery 10 was adjusted to SOC 20% in the 25° C. environment again. Then, the battery 10 was subjected to a discharge test in the same manner as above except that the current value was different. During the discharge, a voltage was measured when the battery was discharged for 10 seconds.

Further, the same procedures as above were repeated three times except that the current value in the discharge test was changed. Here, the maximum current value was set to a current value in which the discharge time was 20 seconds or more.

As described above, the SOC 20% battery was subjected to the discharge tests with five different standard current values in the 25° C. environment.

Next, the results in each test were plotted on a graph in which the current values in each test were expressed on the x-coordinate and the voltage values after 10 seconds in each test were expressed on the y-coordinate. Linear approximation was performed to the plots, and a linear function was obtained. An inclination of the obtained linear function was defined as a resistance T [Ω] of a cell, and a vertical intercept was defined as OCV (open circuit voltage) at SOC 20%, $V_0$ [V].

Next, the resistance T and the open circuit voltage $V_0$ at SOC 20% of the cell, obtained as above, were substituted for the formula: $(V_0-1.8)/T$, to calculate the maximum discharge current M [A] at SOC 20%.

The thus obtained maximum discharge current M of each battery 10 was multiplied by 1.8 V, which is the lower limit voltage. The thus obtained product was defined as the maximum output [W] at the low SOC. The maximum output was divided by the weight of each battery 10 to calculate an output P [W/kg] at the low SOC per unit weight.

The output P [W/kg] at the low SOC per unit weight of each battery 10 was shown in Table 1 below as a value relative to the value in Comparative Example 1, which was defined as 1.

[Measurement of Thickness a of Flat Part of Electrode Group, Total Thickness b of Negative Electrode Current Collector, Thickness D of Positive Electrode, and Thickness E of Negative Electrode]

According to the methods described above, the thickness a of the flat part F of the electrode group 1, the total thickness b of the negative electrode current collector 31, the thickness D of the positive electrode 2, and the thickness E of the negative electrode 3 were measured. The results are summarized in Table 1 below. In Table 1, the value of "a/b" and the value of "D/E" were shown together.

TABLE 1

| | a (mm) | b (mm) | D (μm) | E (μm) | a/b | D/E | Output at Low SOC (Relative Value when the value of Comparative Example 1 is defined as 1) |
|---|---|---|---|---|---|---|---|
| Comparative Example 1 | 10.63 | 0.564 | 77.6 | 103.4 | 18.8 | 0.75 | 1 |
| Comparative Example 2 | 19.97 | 1.056 | 114.4 | 80 | 18.9 | 1.43 | 1.12 |
| Example 1 | 19.57 | 1.812 | 58.3 | 46.3 | 10.8 | 1.26 | 1.72 |
| Example 2 | 10.58 | 0.792 | 64.4 | 58.5 | 13.4 | 1.10 | 1.29 |
| Example 3 | 19.5 | 1.788 | 40.1 | 49.5 | 10.9 | 0.81 | 1.54 |
| Example 4 | 19.63 | 1.236 | 66.1 | 84.7 | 15.9 | 0.78 | 1.3 |

[Results]

As apparent from Table 1, the batteries 10 of Examples 1 to 4 were more excellent in the output characteristics in the low state-of-charge than those of the batteries 10 of Comparative Examples 1 and 2.

It is found that the nonaqueous electrolyte batteries 10 of Examples 1 to 4 are excellent in the output characteristics in the low state-of-charge, and thus the resistance of the negative electrode 3 in the low state-of-charge is low. For that reason, the nonaqueous electrolyte batteries 10 of Examples 1 to 4 are excellent not only in the output characteristics but also in the input characteristics in the low state-of-charge. In addition, it is found that the nonaqueous electrolyte batteries of Examples 1 to 4 are excellent in the output in the low state-of-charge, and thus the resistance of the negative electrode 3 is leveled in the low state-of-charge.

For that reason, in the nonaqueous electrolyte batteries 10 of Examples 1 to 4, the load to the negative electrode current collector 31 accompanied by the charge-and-discharge can be reduced, and the deterioration of the negative electrode current collector 31 can be prevented. For the reasons described above, the nonaqueous electrolyte batteries 10 of Examples 1 to 4 can exhibit the excellent input-and-output characteristics in the low state-of-charge, and the excellent life characteristics.

On the other hand, in Comparative Example 1, the value of E was more than 85 μm. For that reason, in the battery 10 of Comparative Example 1, it can be considered that the resistance of the negative electrode 3 was too high, and thus the output was reduced in the low state-of-charge. In addition, in Comparative Example 1, the value of a/b was more than 16. For that reason, in the battery 10 of Comparative Example 1, the resistance of the negative electrode 3 became high in the low state-of-charge, which can be considered to be a reason for which the output in the low state-of-charge was reduced.

In Comparative Example 2, the value of a/b was more than 16. For that reason, in the battery of Comparative Example 2, it can be considered that the resistance of the negative electrode 3 became high in the low state-of-charge, and thus the output was reduced in the low state-of-charge. In addition, in Comparative Example 2, the value of D/E was more than 1.4. This can be considered to be caused by too large thickness of the positive electrode 2 in the battery 10 of Comparative Example 2. In the battery 10 of Comparative Example 2, it can be considered that the resistance of the positive electrode 2 was increased because of the too large thickness of the positive electrode 2, and thus the output was reduced.

Comparative Example 3

In Comparative Example 3, a nonaqueous electrolyte battery was produced in the following procedures.

First, a positive electrode, which had been produced in the same procedures as in Comparative Example 1, was cut into electrodes having a width of 67 mm and a height of 87 mm of a coated part of the positive electrode and a width of 22 mm and a height of 10 mm of a current-collecting part. In addition, negative electrodes, which had been produced in the same procedures as in Comparative Example 1, were cut into electrodes having a width of 68 mm and a height of 88 mm of a coated part of the negative electrode and a width of 22 mm and a height of 10 mm of a current-collecting part. Thus, the multiple positive electrodes and the multiple negative electrodes were produced.

Next, multiple separators, which were the same separators as used in Comparative Example 1, were provided.

They were stacked in the order of the separator, the negative electrode, the separator, the positive electrode, the separator, and the negative electrode, whereby an electrode group including the stack of Comparative Example 3 was produced. The stack 12 had sizes of 67 mm×97 mm×2.7 mm.

A nonaqueous electrolyte battery of Comparative Example 3 was produced in the same procedures as in Comparative Example 1 except that the thus obtained electrode group of Comparative Example 3 was used.

Example 5

In Example 5, a nonaqueous electrolyte battery was produced in the following procedures.

First, a positive electrode, which had been produced in the same procedures as in Example 1, was cut into electrodes having a width of 67 mm and a height of 87 mm of a coated part of the positive electrode and a width of 22 mm and a height of 10 mm of a current-collecting part. In addition, a negative electrode, which had been produced in the same procedures as in Example 1, was cut into electrodes having a width of 68 mm and a height of 88 mm of a coated part of the negative electrode and a width of 22 mm and a height of 10 mm of a current-collecting part. Thus, the multiple positive electrodes and the multiple negative electrodes were produced.

Next, multiple separators, which were the same separators as used in Example 1, were provided. They were stacked in the order of the separator, the negative electrode, the separator, the positive electrode, the separator, and the negative electrode, whereby an electrode group including the stack from Example 5 was produced. The stack had sizes of 67 mm×97 mm×1.4 mm.

A nonaqueous electrolyte battery of Example 5 was produced in the same procedures as in Comparative Example 1 except that the thus obtained electrode group of Example 5 was used.

(Output Test in Low SOC)

The nonaqueous electrolyte batteries of Example 5 and Comparative Examples 3 were subjected to a output test in a low SOC (low state-of-charge) in the same procedures as in Examples 1 to 4 and Comparative Examples 1 and 2. The results are shown in Table 2 below.

[Measurement of Thickness $a_1$ of Stack, Total Thickness $b_1$ of Negative Electrode Current Collectors, Thickness $D_1$ of Positive Electrode, and Thickness $E_1$ of Negative Electrode]

According to the methods described above, the thickness $a_1$ of the stack 12 of the electrode group 1, the total thickness b of the negative electrode current collectors 31, the thickness $D_1$ of the positive electrode 2, and the thickness $E_1$ of the negative electrode 3 were measured. The results are summarized in Table 2 below. In Table 2, the value of "$a_1/b_1$" and the value of "$D_1/E_1$" were shown together.

TABLE 2

| | $a_1$ (mm) | $b_1$ (mm) | $D_1$ (μm) | $E_1$ (μm) | $a_1/b_1$ | $D_1/E_1$ | Output at Low SOC (Relative Value when the value of Comparative Example 1 is defined as 1) |
|---|---|---|---|---|---|---|---|
| Comparative Example 3 | 2.63 | 0.15 | 77.6 | 103.4 | 17.5 | 0.75 | 1.08 |
| Example 5 | 1.38 | 0.12 | 58.3 | 46.3 | 11.5 | 1.26 | 1.85 |

[Results]

As apparent from Table 2, the nonaqueous electrolyte battery of Example 5 was more excellent in the output characteristics in the low state-of-charge than the nonaqueous electrolyte battery from Comparative Example 3; in other words, the relationship between Example 5 and Comparative Example 3 was the same as the relationship between Examples 1 to 4 and Comparative Example 1 and 2.

It is found that the nonaqueous electrolyte battery of Example 5 is excellent in the output characteristics in the low state-of-charge, and thus the resistance of the negative electrode is low in the low state-of-charge. For that reason, the nonaqueous electrolyte battery of Example 5 has not only the excellent characteristics but also the excellent input characteristics in the low state-of-charge. In addition, it is found that the nonaqueous electrolyte battery from Example 5 has the excellent output in the low state-of-charge, and thus the resistance of the negative electrode is leveled in the low state-of-charge. For that reason, in the nonaqueous electrolyte battery of Example 5, the load to the negative electrode current collector accompanied by the charge-and-discharge can be reduced, and the deterioration of the negative electrode current collectors can be prevented. For the reasons described above, the nonaqueous electrolyte battery of Example 5 can exhibit the excellent input-and-output characteristics in the low state-of-charge, and the excellent life characteristics.

On the other hand, in Comparative Example 3, the value of $E_1$ was more than 85 μm. For that reason, in the battery of Comparative Example 3, it can be considered that the resistance of the negative electrode was too high, and thus the output was reduced in the low state-of-charge. In addition, in Comparative Example 3, the value of $a_1/b_1$ was more than 16. For that reason, in the battery of Comparative Example 1, the resistance of the negative electrode became high in the low state-of-charge, which can be considered to be a reason for which the output in the low state-of-charge was reduced.

According to at least an embodiment and Example described above, the wound electrode is provided. In the electrode group, the a [mm], that is a thickness of the flat part of the electrode group, the b [mm], that is a total thickness of the negative electrode current collector in the flat part of the electrode group, the D [μm], is a thickness of the positive electrode, and the E [μm], is a thickness of the negative electrode, satisfies the relationship formula (1) of 10≤a/b≤16; the relationship formula (2) of 0.7≤D/E≤1.4; and the relationship formula (3) of E≤85. As a result, the wound electrode group can exhibit, in low state-of-charge, excellent input-and-output characteristics.

Furthermore, according to at least an embodiment and Example described above, the electrode is provided. In the electrode group, the $a_1$ [mm], that is a thickness of the stack, the $b_1$ [mm], that is a thickness of the negative electrode current collector or is a total thickness of the negative electrode current collectors, the $D_1$ [μm], that is a thickness of the positive electrode, and the $E_1$ [μm], that is a thickness of the negative electrode, satisfies the relational formula (I) of 10≤$a_1/b_1$≤16; the relational formula (II) of 0.7≤$D_1/E_1$≤1.4; and the relational formula (III) of $E_1$≤85. As a result, the electrode group can exhibit excellent input-and-output characteristics in a low state-of-charge.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising an electrode group comprising a stack comprising:
   a positive electrode;
   a negative electrode or negative electrodes, each comprising a negative electrode current collector and a negative electrode layer provided on the negative electrode current collector, wherein the negative electrode layer comprises a lithium titanium composite oxide; and a separator, wherein the electrode group satisfies the following relational formulae (I) to (III):

$$10 \leq a_1/b_1 \leq 16 \quad (I);$$

$$0.7 \leq D_1/E_1 \leq 1.4 \quad (II); \text{ and}$$

$$E_1 \leq 85 \quad (III),$$

wherein $a_1$ is a thickness of the stack; $b_1$ is a thickness of the negative electrode current collector when the stack comprises the negative electrode, or is a total thickness of the negative electrode current collectors when the stack comprises the negative electrodes; $D_1$ is a thickness of the positive electrode; and $E_1$ is a thickness of the negative electrode, wherein a unit of $a_1$ is mm, a unit of $b_1$ is mm, a unit of $D_1$ is μm, and a unit of $E_1$ is μm;

a nonaqueous electrolyte; and a metal container housing the electrode group and the nonaqueous electrolyte.

2. The nonaqueous electrolyte battery according to claim 1, wherein the negative electrode current collector comprises aluminum or an aluminum alloy.

3. The nonaqueous electrolyte battery according to claim 1, wherein the separator is a non-woven fabric.

4. The nonaqueous electrolyte battery according to claim 1, wherein a ratio $a_1/b_1$ is from 10 to 14.

5. The nonaqueous electrolyte battery according to claim 1, wherein a ratio $D_1/E_1$ is from 0.9 to 1.3.

6. The nonaqueous electrolyte battery according to claim 1, wherein the stack comprises:

positive electrodes each of which is the positive electrode; the negative electrodes;

separators each of which is the separator;

wherein each of the positive electrodes comprises a positive electrode current collector and a positive electrode layer provided on the positive electrode current collector; and wherein the thickness $a_1$ of the stack is a sum of a total thickness of the positive electrode current collectors; a total thickness of the positive electrode layers; a total thickness of the negative electrode current collectors; a total thickness of the negative electrode layers; and a total thickness of the separators.

7. A nonaqueous electrolyte battery comprising:

a wound electrode group comprising a flat part comprising:

a positive electrode;

a negative electrode comprising a negative electrode current collector and a negative electrode layer provided on the negative electrode current collector, wherein the negative electrode layer comprises a lithium titanium composite oxide; and a separator wherein the wound electrode group satisfies the following relational formulae of (1) to (3):

$$10 \leq a/b \leq 16 \quad (1);$$

$$0.7 \leq D/E \leq 1.4 \quad (2); \text{ and}$$

$$E \leq 85 \quad (3),$$

wherein a is a thickness of the flat part; b is a total thickness of the negative electrode current collector in the flat part; D is a thickness of the positive electrode; and E is a thickness of the negative electrode, wherein a unit of a is mm, a unit of b is mm, a unit of D is μm, and a unit of E is μm;

a nonaqueous electrolyte; and a metal container housing the electrode group and the nonaqueous electrolyte.

8. The nonaqueous electrolyte battery according to claim 7, wherein the negative electrode current collector comprises aluminum or an aluminum alloy.

9. The nonaqueous electrolyte battery according to claim 7, wherein the separator is a non-woven fabric.

10. The nonaqueous electrolyte battery according to claim 7, wherein a ratio a/b is from 10 to 14.

11. The nonaqueous electrolyte battery according to claim 7, wherein a ratio D/E is from 0.9 to 1.3.

12. The nonaqueous electrolyte battery according to claim 7, wherein a ratio D/E is from 0.7 to 0.81.

13. The nonaqueous electrolyte battery according to claim 7, wherein the flat part comprises layers of the positive electrode, layers of the negative electrode, and layers of the separator; and wherein the thickness a of the flat part is a sum of a total thickness of the layers of the positive electrode; a total thickness of the layers of the negative electrode; and a total thickness of the layers of the separator.

* * * * *